United States Patent Office 3,097,179
Patented July 9, 1963

3,097,179
ASPHALT-AMINE STABILIZED RUBBER FOR THE PAVING OF GROUNDS AND ITS METHOD OF MANUFACTURE
Marcel Ceintrey, Paris, France, assignor to Societe Chimique et Routiere de la Gironde, Paris, France, a corporation of France
No Drawing. Filed Oct. 15, 1958, Ser. No. 767,268
Claims priority, application France Oct. 24, 1957
8 Claims. (Cl. 260—28.5)

The present invention relates to binders for the paving of grounds, such as roads, highways, or aerodromes either by a direct spreading or coating paving material, such as aggregates of any kind.

It is known that the addition of rubber improves the properties of hydrocarbon binders from both the rheological point of view and ageing point of view.

Various binders have been in consequence suggested which incorporate rubber in latex or powder form or rubber solution, but none of these binders was really satisfactory.

The mixtures of fluxed asphalt and rubber are difficult to spread by means of sprayers in current use for this purpose; moreover, the heating at high temperature for rendering the mixtures fluid partially depolymerizes the rubber which modifies the rheological properties of the binder which loses a part of its qualities. Lastly, one is limited to using small percentages of rubber, otherwise the binder obtained, which is insufficiently capable of being rendered fluid by heating, can no longer be handled by conventional means at temperatures currently employed.

In an effort to obviate these difficulties, aqueous emulsions of asphalt containing latex have been used, which emulsions are generally obtained by adding latex to emulsions of previously prepared asphalt. These emulsions have been solely anionic emulsions whose asphalt globules are negatively charged as are those of the rubber in the latex incorporated in these emulsions. These anionic emulsions containing rubber are unsatisfactory in many respects.

Apart from the phenomenon of the creaming of the latex to which they often give rise, they exhibit, like usual anionic emulsions, only a mediocre adhesiveness as concerns most stoney materials. Moreover, as breakage of these emulsions occurs upon evaporation of the aqueous phase, they are very sensitive to atmospheric conditions during a period of a few hours after their use.

The object of the invention is to overcome these disadvantages.

It is known that cationic or acid emulsions have considerable advantages over anionic emulsions. Heretofore, however, it has not been possible to obtain acid emulsions of hydrocarbon product and rubber, in particular by mixing latex and cationic emulsion of pure asphalt or previously prepared fluxed asphalt, since the latex globule has a negative charge and the asphalt globule a positive charge. The mixture of both of them in accordance with the method used for anionic emulsions results in breakage of the emulsions.

Now, it has been discovered according to the invention that it is possible to obtain an aqueous cationic emulsion of hydrocarbon binder and rubber latex on condition that the latex is previously stabilized. As used in the present specification and claims, "rubber latex" designates the latexes of both natural and synthetic rubbers in which the globules of rubber have a negative charge.

The invention provides an aqueous cationic emulsion of stabilized rubber latex and hydrocarbon binder in which the rubber and the hydrocarbon binder form the dispersed phase. The invention also provides a method of manufacturing such emulsion which comprises stabilizing a rubber latex by an amine directly dispersible in water, a nonionic emulsifying agent or an amino-acid, adding to the stabilized latex the conventional emulsifying agent of cationic emulsions constituted by an amine which is neutralized in excess or not by a mineral or organic acid, diluting the mixture with water so as to form the aqueous phase of the emulsion containing dispersed rubber and dispersing therein a hydrocarbon binder.

Natural or synthetic rubber latexes to which are added one of the aforementioned stabilizing agents, have shown themselves to be remarkably compatible with hydrocarbon binders dispersed in aqueous cationic emulsions. Consequently, no breakage of the emulsions thus produced occurs, despite the initially different polarities of the rubber globules and the hydrocarbon binder globules. Thus, it is possible to fully benefit from the advantageous characteristics of both the rubber-containing binders and the cationic emulsions, as concerns coating or covering properties.

All the amines directly dispersible in water, that is, without addition of acid, could be utilized as stabilizing agents for the latexes. Among these amines there could be mentioned the amines having the following formulae, which are very appropriate for the purpose of the invention:

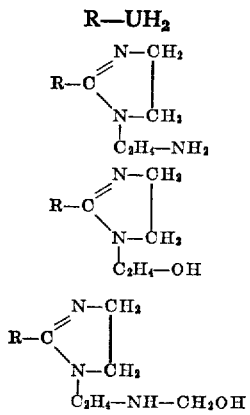

wherein R is a hydrocarbon radical having 12 to 18 carbon atoms, which is saturated in the form $C_nH_{2n+1}$, or non-saturated in the form $C_nH_{2n-1}$ or $C_nH_{2n-3}$.

The amount of amine utilized as a stabilizing agent relative to the latex should be between 5 and 20% by weight. There is no point in increasing the amount of amine, which would only increase the cost price of the subsequently obtained emulsion without any real advantage. On the contrary, efforts should be made to utilize minimum amounts for stabilizing the latex.

The amine could be added to the latex in the form of an aqueous dispersion having a concentration of, for example, around 10%. The latex and the dispersion of amine could be, if desired, diluted with ordinary water so as to facilitate the mixing.

A nonionic emulsifying agent could be used instead of an amine dispersible directly in water for stabilizing the latex, as mentioned hereinbefore. These nonionic emulsifying agents are polyoxyethylene derivatives of, for example, alcohols, acids, ethers, phenols, amides or amines, a large number of which are commercially available. They generally satisfy one of the following formulae:

$$R-(OC_2H_4)_nOH$$

or $$R-NH-(C_2H_4O)_nOH,$$

R—COO($C_2H_4O$)$_n$H
R—CONH($C_2H_4O$)$_n$H wherein R is an aliphatic, aryl or alkyl-aryl hydrocarbon radical and $n$ an integer between 6 and 30.

Among commercially available products which could be used in accordance with the invention there could be mentioned the product "Alphenyl" which corresponds to the first of the aforementioned formulae in which R is the butylphenylene radical and $n$ is 8, said product resulting from the condensation of about 8 molecules of ethylene oxide with one molecule of butylphenol and the "Polyrad" products which correspond to the second of said formulae, wherein R—NH is the residue of rosin amine (dehydroabiethylamine) R—$NH_2$. In "Polyrad 1100," for example, the integer $n$ is equal to 11. "Emulphor A" and "Ethofat 6060" are trade names of products which correspond to the third formula, RCOO— being the residue of oleic acid in the former and stearic acid RCOOH in the latter. Finally "Base LP12" is the trade name of a product corresponding to the first formula, in which R is the residue of lauric alcohol ROH.

The proportion of nonionic stabilizing agent relative to the latex is advantageously between 2 and 10% by weight. Lastly, another group of stabilizing agents which could be used in the invention is constituted by the amino-acids which could be defined as products of hydrolysis of proteins, notably those resulting from the alkaline hydrolysis of gelatine and casein. These amino-acids are used in a proportion between 2 and 50% by weight of latex, depending on the type of amino-acid used.

To the latex stabilized by one of the three aforementioned stabilizing agents there is thereafter added the conventional emulsifying agent for cationic emulsions. It will be recalled that this emulsifying agent is constituted by a amine which is neutralized, in excess or not, by a mineral or organic acid so that the water to which this emulsifying agent is added has an acid pH of around 1.5 to 5.

The aminic emulsifying agents for cationic emulsions constitute groups which are well known to those skilled in the art. There could be mentioned among others in these groups emulsifying agents mentioned hereinbefore concerning the dispersible amines, the radical R, comprising, however, a greater number of carbon atoms, since owing to the fact that the amine is rendered soluble by an acid, there is no need for these amines to be directly dispersible in water. There could of course also be used amines directly dispersible in water. However, no advantage is gained thereby, since these amines are generally more expensive than their higher non-dispersible homologues. The proportion of the conventional aminic emulsifying agent for the cationic emulsions could vary between 0.2% and 0.6% by weight of the total emulsion. Preference will be given to the lower limit when the stabilizing agent for the latex is a dispersible amine.

As acids which could be used rendering the amines soluble, there could be mentioned hydrochloric acid, formic acid and acetic acid, hydrochloric acid being preferred for reasons of economy.

The stabilized latex to which is added the cationic emulsifying agent is then diluted so as to form the aqueous phase of the emulsion and the chosen hydrocarbon binder is dispersed in this aqueous phase in which the rubber has already been dispersed. This dispersion is effected in a hot homogenizing mixer so as to render the hydrocarbon binder fluid. The relative proportions of the dispersed constituents are the following, relative to the total weight of the emulsion:

| | Percent |
|---|---|
| Rubber | 2 to 10 |
| Hydrocarbon binder | 40 to 70 |

Hydrocarbon binders which could be used are all the conventional binders employed in paving grounds. There could be mentioned in particular pure asphalts having an A.S.T.M. needle penetration of 40 to 400 mm. during 5 seconds with a weight of 100 g. and at a temperature of 25° C., mixtures of tar and asphalt, petroleum oil cutbacks, that is, asphalt fluxed by a lighter fraction of distillation, such as paraffin oil and having a B.R.T.A. (British Road Tar Association) viscosity of 50 to 500 seconds with an orifice of 10 mm. at 25° C., and the aforementioned products fluxed by means of preferably Anthracenic oils or, if desired, oils obtained in the distillation of tar.

Preference is notably given to cut-backs fluxed with 5% to 20% of anthracenic oil, which permits obtaining for the residual binder after rupture of the emulsion a suitable viscosity insuring good attachment to, and good wetting of, the aggregates, and a very slow ageing. The addition of rubber highly increases the viscosity of the hydrocarbon binder so that advantage is gained in starting with a binder which is more fluid than those usually used in rubber-free emulsions.

The emulsions obtained according to the invention could be utilized for spreading or for coating aggregates in accordance with conventional methods of application of aqueous emulsions. They behave in the same way as ordinary cationic emulsions, the following advantages of which they possess:

(a) Good adhesive properties as concerns acid materials.

(b) Rupture starting at the surface of the coated materials, and manifested by very slight sensitivity to atmospheric conditions of these emulsions in the course of their application.

They possess, moreover, the advantage over ordinary cationic emulsions of ensuring a homogeneous deposit of hydrocarbon binder and rubber which is superior to that of the hydrocarbon binder used alone as concerns rheological and highway properties.

The following examples illustrate the invention without, however, restricting the scope of the latter.

*Example 1*

To prepare a ton of emulsion having 65% hydrocarbon binder, 25 kg. ordinary latex including 60% rubber preserved with ammonia are used in which are added 30 kg. of a 10% amine dispersion having the following formulae:

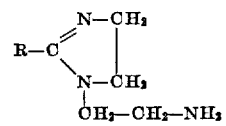

wherein R is the hydrocarbon radical of fatty acids which are found in coconut oil. It is to be understood in this respect that when R is defined as the hydrocarbon radical of a fatty acid, said radical includes the carbon atom of the carboxyl group, the latter being converted into a —$CH_2$— group.

After mixing the two foregoing constituents, the pH of the latex thus stabilized remains higher than 8. 20 kg. of 10% solution of amine hydrochloride having the following formula are then added:

R—NH—$CH_2$—$CH_2$—$NH_2$—HCl wherein R is the hydrocarbon radical of the fatty acids found in tallow.

The aqueous solution of this hydrochloride is acid and its pH is between 1.5 and 5. There is no rupture of the latex dispersion when mixing with the amine solution.

The mixture obtained is diluted with ordinary water until 350 kg. of acid emulsion of diluted latex are obtained.

This emulsion is heated to 90° C. and is put into an homogenizing mixer together with 650 kg. of cut-back which has a viscosity of 400/500 seconds and is fluxed with 10% anthracenic oil.

An emulsion of fluxed asphalt and rubber is obtained which can be used for surface spreading or for coating aggregates of any kind.

Example 2

To prepare a ton of emulsion having 65% hydrocarbon binder, 25 kg. of ordinary latex including 60% rubber preserved with ammonia are used. There is added thereto 1 kg. of "Alphenyl" (a commercially available non-ionic emulsifying agent derived from condensation of about 8 molecules of ethylene oxide with one molecule of butylphenol). The mixture is diluted with ordinary water until the diluted mixture contains 50% of water. It is then mixed with 40 kg. of amine hydrochloride solution containing 4 kg. of amine having the formula $$R-NH-C_2H_4-NH_2$$

wherein R is the hydrocarbon radical of the fatty acids of tallow, and 4.500 kg. of commercial 33% hydrochloric acid (which corresponds to an excess of about 100%). When mixing, there is no rupture and the acid latex obtained can therefore be diluted with ordinary water until 250 kg. are reached so as to constitute the aqueous phase of the emulsion. This aqueous phase is heated at 90° C. and is introduced in a homogenizing mixer with 650 kg. of asphalt which has a penetration of 180/200 and is fluxed with 12% of anthracenic oil and 6% of phenolic oil.

In the preceding example, Alphenyl could be replaced without modifying its amount by Emulphor A (trade name of a condensation product of oleic acid and ethylene oxide), by Ethofat 6060 (trade name of a condensation product of stearic acid and ethylene oxide), by Base LP 12 (trade name of a condensation product of lauric alcohol and ethylene oxide) or by Polyrad 1100 (trade name of a condensation product of rosin amine and ethylene oxide.

Example 3

To prepare one ton of emulsion having 65% hydrocarbon binder, 25 kg. of ordinary latex preserved with ammonia is used. Added to this latex are 10 kg. of 10% solution of casein hydrolyzed by heating with 0.4% of sodium hydroxide relative to the solution. The mixture is diluted with ordinary water until the diluted mixture contains 50% of water. It is then mixed with 40 kg. of amine hydrochloride solution prepared under the same conditions as in the preceding example. When mixing, there is no rupture and the acid latex thus stabilized can be diluted with ordinary water and 650 kg. of hydrocarbon binder could be added thereto in the same manner as in the preceding examples.

Although specific examples of carrying out the invention have been described, it must be understood that the scope of the invention is in no way restricted thereto.

Having now described my invention what I claim as new and desire to secure by Letters Patent is:

1. Binder for paving grounds, comprising an aqueous emulsion having a pH of about 1.5 to about 5 and containing a stabilized hydrocarbon rubber latex and a hydrocarbon binder selected from the group consisting of asphalts, tar and asphalt mixtures and cut-back asphalts, said latex and said hydrocarbon binder being dispersed in said emulsion by means of a cationic emulsifying agent consisting of at least one amine containing a hydrocarbon radical with at least 12 carbon atoms substantially neutralized by an acid, said rubber latex being stabilized by a member selected from the group consisting of (A) the amines satisfying the following formulae:

and

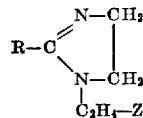

wherein R is a hydrocarbon radical having 12 to 18 carcon atoms and Z is a member selected from the group consisting of $-NH_2$, $-OH$ and $-NH-CH_2OH$; (B) the non-ionic emulsifying agents selected from the group consisting of the polyoxyethylene derivatives of alcohols, acids, ethers, phenols, amides and amines, and (C) the amino-acids derived from the hydrolysis of proteins.

2. Binder as claimed in claim 1, wherein said cationic emulsifying agent is present in an amount of about 0.2% to about 0.6% by weight of the total emulsion.

3. Binder as claimed in claim 1, wherein the latex in said emulsion is stabilized by an amine (A), said amine being present in a proportion of 5% to 20% by weight of said latex.

4. Binder as claimed in claim 3, wherein said emulsion contains 2% to 20% by weight of rubber and 40% to 70% by weight of hydrocarbon binder.

5. Method for preparing a binder for paving grounds, comprising stabilizing a hydrocarbon rubber latex by a stabilizer selected from the group consisting of (A) the amines satisfying the following formulae:

and

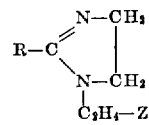

wherein R is a hydrocarbon radical having 12 to 18 carbon atoms and Z is a member selected from the group consisting of $-NH_2$, $-OH$ and $-NH-CH_2OH$; (B) the non-ionic emulsifying agents selected from the group consisting of the polyoxyethylene derivatives of alcohols, acids, ethers, phenols, amides and amines, and (C) the amino-acids derived from the hydrolysis of proteins, adding to the latex thus stabilized a cationic emulsifying agent consisting of at least one amine containing a hydrocarbon radical with at least 12 carbon atoms substantially neutralized by an acid, diluting the mixture obtained with water so as to form an aqueous emulsion containing dispersed rubber and dispersing a hydrocarbon binder selected from the group consisting of asphalts, tar and asphalt mixtures and cut-back asphalts into said emulsion after the latter has been heated at a temperature high enough to fluidify said hydrocarbon binder but below the boiling point of water, thereby obtaining a final aqueous emulsion of rubber and bituminous binder having a pH of about 1.5 to about 5.

6. Method as claimed in claim 5, wherein said cationic emulsifying agent is used in an amount of about 0.2% to about 0.6% by weight of the total emulsion.

7. Method as claimed in claim 5, wherein the latex in said emulsion is stabilized by an amine (A), said amine being used in a proportion of 5% to 20% by weight of said latex.

8. Method as claimed in claim 7, wherein said final emulsion contains 2% to 20% by weight of rubber and 40% to 70% by weight of hydrocarbon binder.

References Cited in the file of this patent

UNITED STATES PATENTS

| | | |
|---|---|---|
| 2,509,777 | McMillan et al. | May 30, 1950 |
| 2,714,582 | Day | Aug. 2, 1955 |
| 2,857,351 | Carroll | Oct. 21, 1958 |
| 2,886,458 | Ceintrey | May 12, 1959 |

OTHER REFERENCES

Sisley et al.: Encyclopedia of Surface-Active Agents (1952), Chemical Publishing Co., Inc., New York, N.Y., pages 157, 345, 367.